(12) United States Patent
Fischer et al.

(10) Patent No.: US 10,940,353 B2
(45) Date of Patent: Mar. 9, 2021

(54) TRAMPOLINE

(71) Applicant: bellicon AG, Lucerne (CH)

(72) Inventors: Stefanie Fischer, Stuttgart (DE); Martin Birzele, Rudersberg (DE)

(73) Assignee: Bellicon AG, Lucerne (CH)

( * ) Notice: Subject to any disclaimer, the term of this patent is extended or adjusted under 35 U.S.C. 154(b) by 20 days.

(21) Appl. No.: 15/765,870

(22) PCT Filed: Sep. 30, 2016

(86) PCT No.: PCT/EP2016/073434
§ 371 (c)(1),
(2) Date: Apr. 4, 2018

(87) PCT Pub. No.: WO2017/032907
PCT Pub. Date: Mar. 2, 2017

(65) Prior Publication Data
US 2018/0280750 A1    Oct. 4, 2018

(30) Foreign Application Priority Data

Oct. 4, 2015    (DE) ..................... 10 2015 116 819.7
Oct. 4, 2015    (DE) ..................... 10 2015 116 820.0
Feb. 22, 2016  (DE) ..................... 10 2016 103 072.4

(51) Int. Cl.
*A63B 5/11* (2006.01)
*F16B 2/06* (2006.01)
(Continued)

(52) U.S. Cl.
CPC ............ *A63B 5/11* (2013.01); *A63B 21/4035* (2015.10); *F16B 2/065* (2013.01); *F16B 2/12* (2013.01);
(Continued)

(58) Field of Classification Search
CPC .... A63B 5/11; A63B 5/08; A63B 5/16; A63B 21/4035; A63B 21/023; A63B 21/055;
(Continued)

(56) References Cited

U.S. PATENT DOCUMENTS

| 2,854,293 A | 9/1958 | Riblet |
| 3,195,938 A | 7/1965 | Rifken |
| 4,657,218 A * | 4/1987 | Scheberle ............... B60N 2/38 248/162.1 |

(Continued)

FOREIGN PATENT DOCUMENTS

| CN | 2421045 Y | 2/2001 |
| CN | 2934696 Y | 8/2007 |

(Continued)

OTHER PUBLICATIONS

International Search Report of International Application No. PCT/EP2016/073434 dated Dec. 12, 2016, 6 pages.

(Continued)

*Primary Examiner* — Megan Anderson
*Assistant Examiner* — Kathleen Vermillera
(74) *Attorney, Agent, or Firm* — Fay Sharpe LLP

(57) ABSTRACT

A trampoline includes a stand which has a peripheral frame, a plurality of legs and a bounce mat which is elastically suspended on the frame. At least one guide is secured to the stand. A bar is received in a height adjustable manner in the guide. An inner piece is movably received in the guide. The bar is fixed by a relative movement between the inner piece and the guide.

16 Claims, 8 Drawing Sheets

(51) Int. Cl.
  *F16B 2/18* (2006.01)
  *F16B 7/04* (2006.01)
  *F16B 7/14* (2006.01)
  *A63B 21/00* (2006.01)
  *F16B 2/12* (2006.01)
  *A63B 21/02* (2006.01)

(52) U.S. Cl.
  CPC ............ *F16B 2/185* (2013.01); *F16B 7/0453* (2013.01); *F16B 7/1454* (2013.01); *F16B 7/1472* (2013.01); *A63B 21/023* (2013.01); *A63B 2225/093* (2013.01); *A63B 2225/685* (2013.01)

(58) Field of Classification Search
  CPC . A63B 21/0552; A63B 21/0557; A63B 21/00; A63B 21/11; A63B 21/16; A63B 21/072–08; A63B 2225/685; A63B 2225/093; F16B 7/1472; F16B 7/1454; F16B 7/0453; F16B 2/185; F16B 2/12; F16B 2/065; F16B 3/06; Y10T 403/32467; Y10T 403/32475; Y10T 403/32491; Y10T 403/32508; Y10T 403/7077; Y10T 403/7079; F16M 13/02
  USPC ............................................... 482/23, 25–32
  See application file for complete search history.

(56) References Cited

U.S. PATENT DOCUMENTS

| | | | | |
|---|---|---|---|---|
| 4,836,530 A | * | 6/1989 | Stanley, Jr. | ............. A63B 5/11 482/27 |
| 5,374,225 A | * | 12/1994 | Wilkinson | ............... A63B 5/11 482/114 |
| 5,607,377 A | * | 3/1997 | Wilkinson | ............... A63B 5/11 482/27 |
| 6,261,207 B1 | | 7/2001 | Publicover et al. | |
| 8,657,129 B2 | * | 2/2014 | Marks | .................... G10D 13/00 211/195 |
| 2007/0012902 A1 | | 1/2007 | Mo | |
| 2008/0009394 A1 | | 1/2008 | VanElverdinghe et al. | |
| 2010/0075810 A1 | | 3/2010 | Schaffer | |
| 2010/0240496 A1 | * | 9/2010 | Chen | ........................ A63B 5/11 482/27 |
| 2014/0241789 A1 | * | 8/2014 | Chiu | .................... F16B 7/1454 403/109.1 |

FOREIGN PATENT DOCUMENTS

| | | |
|---|---|---|
| CN | 201099330 Y | 8/2008 |
| CN | 103639785 A | 3/2014 |
| CN | 204344594 U | 5/2015 |
| CN | 204543368 U | 8/2015 |
| DE | 694 28 902 T2 | 6/2002 |
| DE | 20 2011 106 375 U1 | 6/2012 |
| DE | 20 2014 007 636 U1 | 10/2014 |

OTHER PUBLICATIONS

International Preliminary Report on Patentability and Written Opinion of the International Searching Authority of International Application No. PCT/EP2016/073434 dated Apr. 10, 2018, 9 pages.

* cited by examiner

TRAMPOLINE

BACKGROUND

The invention relates to a trampoline, with a stand which has a peripheral frame and a plurality of legs, a bounce mat which is suspended elastically on the frame, at least one guide which is secured to the stand, and a bar which is received in a height-adjustable manner in the guide.

The invention is directed in particular to what are called mini trampolines, which are also referred to as fitness trampolines. These are comparatively small trampolines which have a maximum diameter of 2 to 3 meters and which are used in physiotherapy and in the fitness sector.

In the case of mini trampolines or fitness trampolines, a distinction is made between trampolines having a spring suspension and those having a rubber-cord suspension. In the case of the spring suspension, the bounce mat is secured to the frame by coil springs. For this purpose, the bounce mat has, as a receiving device, a bow or an eyelet, for example, which is secured to the bounce mat by means of a loop and in which a respective coil spring engages. At its other side, the coil spring is hooked in the frame. A trampoline with a spring suspension provides considerable acceleration forces.

In the case of the rubber-cord suspension, one or more elastic cord rings or (open) cords are used, which connect the bounce mat to the frame. The receiving device here can be configured as a hook element, in each of which a suspension is hooked. A possible alternative is a loop through which is pulled a cord that connects the bounce mat to the frame. The greater elasticity of a rubber-cord suspension of this kind ensures "softer" deceleration of the body and to this extent is not only gentle on the joints but also prolongs the phases of muscular stress and relaxation when jumping, and this affords advantageous training effects.

The invention is directed both to trampolines with spring suspensions and to trampolines in which the suspension is configured as an elastic cord or an elastic cord ring. In principle, the invention can be used in any type of trampoline, independently of the nature of the suspension of the bounce mat and the geometry of the frame.

A common feature of the known trampolines is that they have a frame from which legs extend. The legs ensure that the frame is located at a defined distance from the ground when the trampoline is set up. This ensures that the bounce mat can move in the direction of the ground during trampolining.

Round frames and also polygonal frames are known in practice. The frame is composed of a tube, which is bent in order to produce the frame.

In recent times, a fitness trend has been seen that entails special movement programs carried out on the trampoline. The holding bar is used in order to provide a secure hold on the trampoline, wherein the holding bar generally has, at its free end, handles which protrude laterally from the holding bar and which the user can grasp during the exercises.

DE 20 2014 007 636 U1 discloses a trampoline in which the holding bar is secured to a leg of the trampoline via an intermediate piece. In addition, the holding bar is secured by two lateral struts which connect the lower end of the holding bar to the adjacent legs of the trampoline. The known construction is stable. However, it entails the use of a large amount of material. Moreover, assembly is complicated.

A trampoline is known in practice which has a clamp device welded onto its frame. The holding bar is received in a longitudinally displaceable manner in the clamp device and can be locked. The known trampoline is of a simple construction and is easy to assemble.

However, it has been found in practice that the useful life leaves something to be desired.

The object of the invention is to make available a trampoline which has a bar and which is easy to assemble and also withstands relatively high loads.

BRIEF SUMMARY

This object is achieved by a trampoline with a stand which has a peripheral frame and a plurality of legs issuing from the frame, a bounce mat which is suspended elastically on the frame, at least one guide which is secured to the stand, a bar which is received in a height-adjustable manner in the guide, and an inner piece which is received movably in the guide, wherein the bar is fixed by a relative movement between the inner piece and the guide.

The invention permits fixing of the bar in the guide, which also withstands higher loads during intensive use of the trampoline. The inner piece here provides the clamping force. The bar is preferably clamped between the guide and the inner piece.

In the context of the invention, the guide has two roles. Firstly, it receives and fixes the bar.

Secondly, it advantageously forms a receptacle for the inner piece.

In the context of the invention, it is possible to use a bar which has a free end. The free end carries, for example, a handle arrangement or a support for appliances. Only one guide will then be provided for the bar. Alternatively, a bar can be used which is bent in a U shape. It has two free ends, of which each end can be inserted into a respective guide. Two guides will then preferably be provided for the bar. For reasons of clarity, a stand with only one guide is described in the description below.

The guide advantageously has at least a first opening through which the bar is inserted. The opening is expediently adapted to the outer contour of the bar but is larger than the outer contour of the bar, such that the bar can easily be inserted into the guide and adjusted in height. It is preferable for two openings to be provided in the guide. This leads to more stable guiding of the bar. The two openings are formed in the guide at the top and at the bottom (when the trampoline set up). They are expediently flush with each other.

In a development of the invention, it is proposed that the guide is formed as a tube section. The guide preferably has a peripheral circumferential wall. The tube section is an embodiment of the guide that is particularly stable and at the same time easy to produce. The cross section of the tube section can be round or polygonal, in particular circular or square. Oval or rectangular cross-sectional areas are also possible. In the context of the invention, the circular cross section is regarded as particularly advantageous, specifically for reasons of manufacturing technology and also for safety-related reasons, since the round shape poses less risk of injury in the present use.

The first opening is preferably formed in the circumferential wall. If the tube section is arranged perpendicularly with respect to the axial extent of the legs, i.e. horizontally in the case of a standing trampoline, the opening is arranged at the top, and, as has been stated, it is advantageous if a further opening is formed on the underside of the tube section. The bar then passes through the upper and lower opening of the guide/the tube section. The upper opening and the lower opening are preferably flush.

It has already been mentioned above that the inner piece is arranged movably in the guide. The outer contour of the inner piece is preferably adapted to the inner contour of the guide. In the case of a tube section with a cylindrical inner face, it is therefore advantageous if the inner piece has a cylindrical outer face. The outer face has a diameter slightly smaller than the internal diameter of the guide, such that the inner piece is easily movable in the guide, which makes it easier to fix the bar in the guide.

It is considered advantageous if the inner piece has an opening through which the bar passes. The opening can be a drilled hole. In the case of a cylinder section, it passes transversely through the cylinder section.

The inner piece can preferably be oriented in the guide such that the openings of the guide and the opening of the inner piece are flush. The openings of the inner piece and of the guide do not necessarily have to be the same size. However, they are at least as large as the external diameter of the bar.

In this connection, it is noted that an embodiment in the form of a cylindrical inner piece has been discussed above. The opening for the bar interrupts the cylinder shape. It is nonetheless a cylinder shape within the meaning of the invention (with an opening).

In addition to strict demands concerning the stability of the trampoline, it is also required, from the point of view of the user, that the assembly of the trampoline, the securing of the bar to the trampoline and, if appropriate, maintenance of the trampoline are easy and straightforward. In this connection, it is proposed that the guide has a third opening through which the inner piece can be inserted into the guide. In the case of a tube section, the insertion opening will be provided at the front face. A preferred illustrative embodiment is characterized in that the direction of insertion is perpendicular to the two openings in the circumferential face of the guide. It is likewise considered preferable if the insertion opening is arranged radially inward. The inner piece is advantageously inserted into the guide from the inside toward the outside.

The diameter of the opening preferably corresponds to the internal diameter of the guide. The inner piece can thus be pushed easily into the guide. The inner piece is advantageously received in a movable manner therein.

To move the inner piece, an actuating mechanism is advantageously provided. The inner piece is preferably actuated by an actuating mechanism. The invention thus provides a clamp mechanism for the bar consisting of only three main components and giving much better and more stable clamping than is possible in conventional solutions. The clamp mechanism is composed of guide, inner piece and actuating mechanism.

A particularly advantageous embodiment of the invention is characterized in that the actuating mechanism is supported on the frame or preferably on the guide. Such a construction creates a compact overall construction which is at the same time able to apply high clamping forces to the bar. The guide preferably has a front wall on which the actuating mechanism is supported.

To apply the clamping forces, it is proposed that the actuating mechanism and the inner piece are in threaded engagement. The inner piece is moved in the guide by a rotation of the actuating mechanism. The bar is advantageously fixed between the guide and the inner piece, as is deemed advantageous in principle.

In the rotation of the actuating mechanism, two movement models are basically conceivable. Either the inner piece moves away from the actuating mechanism when the actuating mechanism is rotated, or it moves toward the actuating mechanism.

The threaded engagement can be obtained by the actuating mechanism having a threaded pin which engages in a thread of the inner piece. The actuating mechanism is preferably a hand screw, which has a grip part, for example of plastic, and said threaded pin. The thread is preferably formed in the inner piece at the front.

Alternatively, the inner piece has a threaded pin which engages in a thread of the actuating mechanism. The actuating mechanism here can also have a grip part (for example of plastic), with a nut received in the grip part.

In the two embodiments described above, the actuating mechanism has grip parts which are rotated in order to bring about the movement of the inner piece.

Alternatively, the actuating mechanism is designed as a tensioning lever whose pivoting effects a movement of the inner piece in the direction of the lever. Analogously to the grip part, the tensioning lever can have a thread or a threaded pin which interacts with the inner piece. The thread is used for preliminary adjustment. The tensioning lever is pivoted in order to apply the final clamping force. The mechanics of tensioning levers are known per se. The tension is obtained via an eccentric of the tensioning lever.

The trampoline according to the invention can be used at home but also in fitness centers. In fitness centers, the trampolines according to the invention are often used in groups. This means that the trampolines have to be stowed away after use. In this connection, it is proposed that the actuating mechanism has a lever with which the actuating mechanism is rotatable, wherein the lever is mounted so as to be longitudinally displaceable in the actuating mechanism. The displaceability of the lever makes it possible to stack the trampolines. During stacking, the lever is brought to a position in which it does not get in the way of the trampoline adjacent to it (placed on top of it). The lever can be produced from metal. A further advantage of the lever is that the tightening moment is relatively large, which leads to a high clamping force.

The guide can be connected to the structure in different ways. For example, the guide can be screwed onto or bonded to the frame or a leg. The stands are often produced from metal, in particular steel or stainless steel. In this connection, it is proposed that the guide is welded to the stand. This kind of securing is particularly suitable for taking up the periodic loads that occur during the use of the trampoline.

It will be noted at this point that the bar can have several functions. As has already been mentioned at the outset, the bar can be designed as a holding bar and can have at least one handle arrangement which the user can grasp when jumping or swinging. For example, the handle arrangement comprises two grips extending laterally from the bar. Alternatively or in addition, it is possible that the bar has (additionally) a receptacle for an electronic appliance. The latter can be a tablet PC or, for example, an appliance that monitors the physical functions of the user.

When the bar is used as a holding bar, considerable forces act on the holding bar during use. The guide is thus subjected to particular loading, particularly in view of the fact that considerable lever forces act on the guide on account of the longitudinal extent of the holding bar. In an important development of the invention, it is proposed that the frame forms a recess in which the guide is received. The recess can be a partial recess, in which case the frame is not fully opened (in the sense of cut through), and instead only a depression is formed in the frame. Compared to conventional solutions in which the bar or its receptacle is only welded laterally onto the frame, the recess forms a greater contact face, which has the effect of substantially increasing the strength. Although the recess in the first instance causes a weakening of the frame, the attachment of the guide compensates for this by affording the considerable advantage of stable securing of the guide and, therefore, a durable and stable overall construction which also withstands the high lever forces that occur during training on the trampoline.

It is considered particularly advantageous if the peripheral frame is interrupted and the guide is inserted into the resulting recess. In the case of metal frames, the guide is expediently welded in. The frame thus advantageously bears on the guide at both sides. A large contact surface can be obtained in this way. This provides an excellent hold of the guide. At the same time the frame remains stable. The insertion of the guide into the frame has the further advantage of a compact design. The trampoline is in this way easy to stack.

It has already been mentioned above that it is advantageous if the guide is designed as a tube section. The latter can be a polygonal or round (cylindrical) tube section. The production of a tube section is expedient. A round shape reduces the risk of injury.

An advantageous embodiment of the invention is characterized in that the tube section is arranged perpendicularly with respect to the direction of extent of the legs. It is proposed in particular that the tube section opens radially inward with respect to the peripheral frame. This embodiment is very compact. The inner piece can be inserted into the tube section radially from the inside. Its direction of movement is preferably radial. A tube section also promotes stackability. The invention allows the tube section to protrude by a maximum of 2 cm above and below the frame, which is in principle considered advantageous in the context of the invention.

The guide preferably has a front wall. The actuating mechanism is advantageously supported on the front wall. The thickness of the front wall is chosen such that it can take up the clamping forces exerted on it by the actuating mechanism. The actuating mechanism preferably engages through the front wall. The actuating mechanism is expediently mounted rotatably in the front wall.

BRIEF DESCRIPTION OF THE DRAWINGS

The invention is explained in more detail below on the basis of a preferred illustrative embodiment and with reference to the appended drawing, in which.

DETAILED DESCRIPTION

Figure 1:
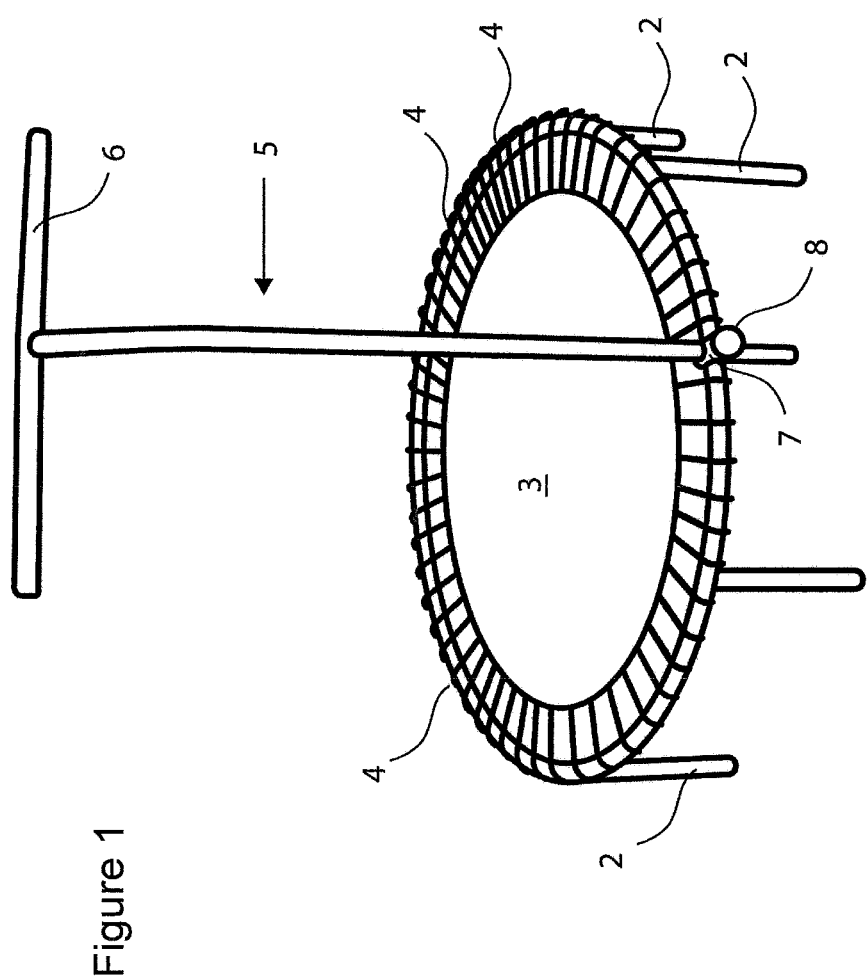
FIG. 1 shows a schematic perspective view of a trampoline according to the invention with a holding bar.

FIG. 1 shows an illustrative embodiment of a trampoline according to the invention. The trampoline has a frame 1 which is supported on the ground via a plurality of legs 2. The frame holds a bounce mat 3, which is held on the frame via a large number of spring elements 4. The spring elements 4 can be rubber-cord sections which are either of an open or of a closed configuration. Both variants are known from the prior art. The rubber-cord sections can be suspended in receiving elements, for example hook elements, secured to the bounce mat. Alternatively, metal springs are used, which are likewise known from the prior art.

A bar 5 is secured to the trampoline. In the illustrative embodiment shown, the bar 5 is designed as a holding bar and has a handle 6. Alternatively or in addition, the bar can also have a support for an electronic appliance, for example a tablet PC or the like. The bar can also assume other functions. For example, a rubber-elastic strap can be secured to the bar in order to provide support when exercises are being performed on the trampoline. To make matters simpler, reference is made below exclusively to a holding bar.

The holding bar 5 is held in a guide 7 which is secured, for example screwed or welded, to the frame 1. The guide can also be secured to one of the legs 2. The holding bar 5 is adjustable in height and can be fixed in the guide 7 by means of an actuating mechanism 8 (only indicated in FIG. 1).

Figure 2:
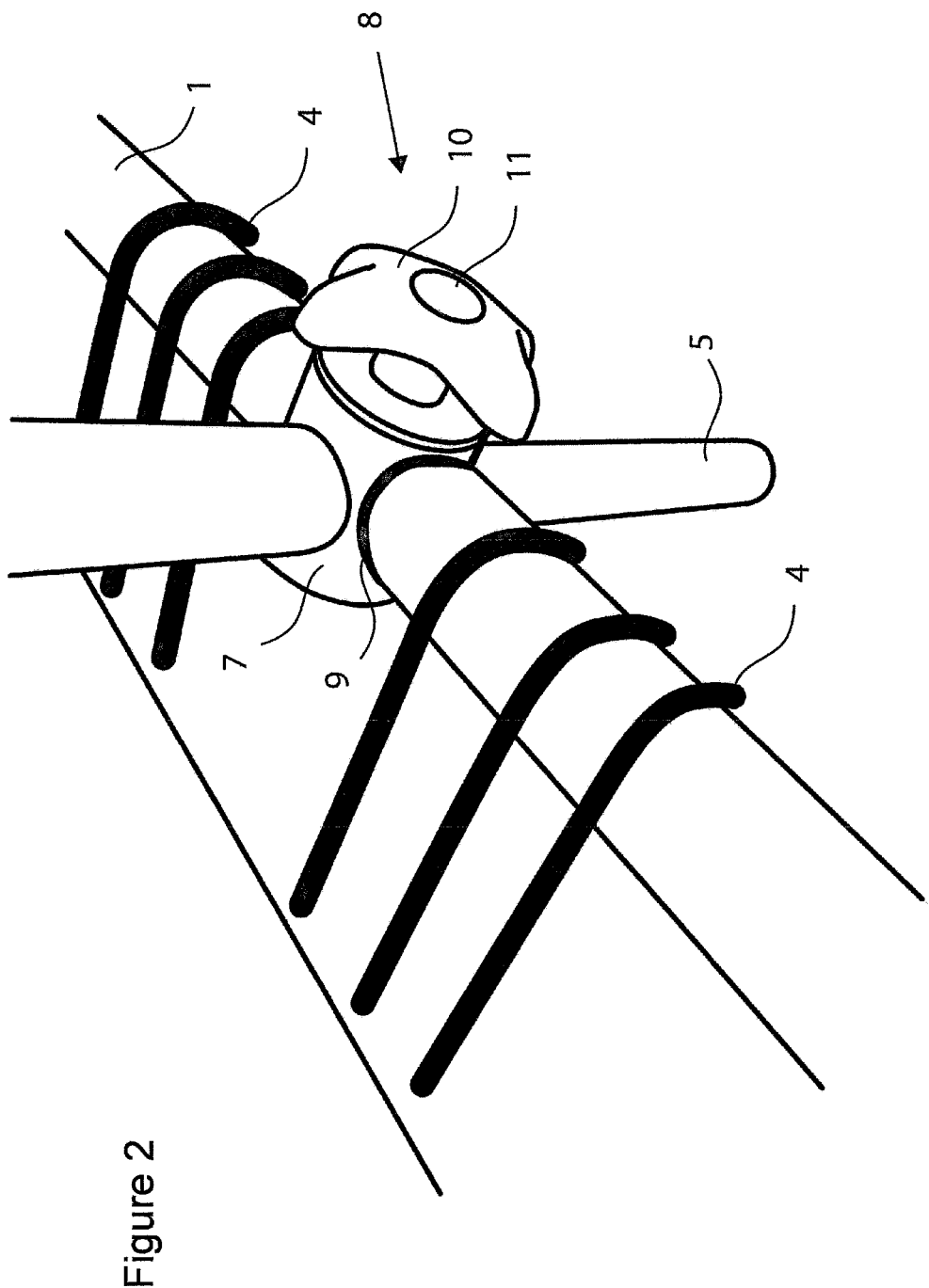
FIG. 2 shows a schematic view of how the holding bar is secured to the trampoline frame.

FIG. 2 shows the guide 7 from FIG. 1 in more precise detail. The guide 7 is firmly welded to the frame 1, as can be seen from the weld seam 9. For this purpose, the frame 1 is divided, at the place where the guide 7 is inserted, and forms a recess A. This gives the overall construction a high degree of stability while at the same time providing an elegant and slim design. The recess is shown for clarity in FIG. 6.

The actuating mechanism 8 has a grip 10 which can be made of plastic. The grip sits on a rotation axle 11 which has a thread, as is described in more detail in connection with FIGS. 3 and 4.

Figure 3:
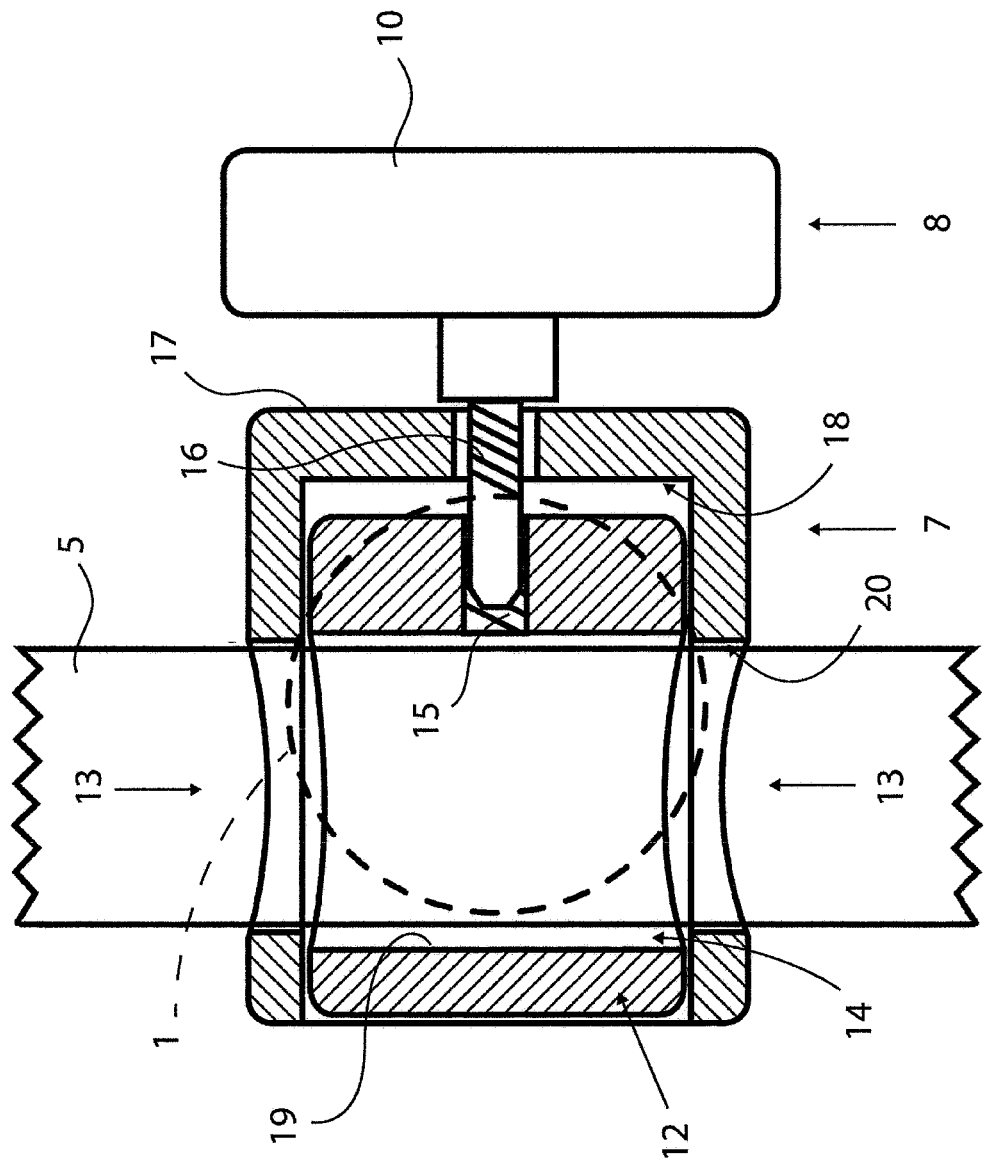
FIG. 3 shows a schematic sectional view through the guide in which the holding bar is releasably received.

Reference is made to FIG. 3, which shows a schematic section through the guide 7. The guide 7 is welded to the frame 1. The frame 1 encloses the guide preferably on both sides. The frame is indicated by a broken line in FIG. 3.

The holding bar 5 is received in the guide 7 in such a way as to be displaceable in the direction of its longitudinal axis. The holding bar 5 can be fixed in the guide 7. For this purpose, an inner piece 12 is received movably in the guide 7. The inner piece 12 is preferably guided slidably in the guide 7. The inner piece 12 is preferably substantially cylindrical.

The guide 7 has two openings 13, which are preferably flush. The inner piece 12 likewise has an opening 14. The bar 5 can be inserted through the openings 13, 14. For this purpose, the openings 13, 14 are expediently flush and are preferably larger than the cross section of the bar 5, such that the bar can be inserted through the openings.

It will be noted at this point that only a part of the holding bar is shown in FIG. 3. The holding bar can have a round cross section. Alternatively, it has a polygonal cross section, in particular a square cross section. The openings are adapted to the cross-sectional shape of the holding bar.

The inner piece 12 is coupled to the actuating mechanism 8. For this purpose, the inner piece 12 has an inner thread 15 which is in engagement with a threaded pin 16 of the actuating mechanism 8. The threaded pin 16 is rotated by means of the grip 10. On account of the threaded engagement between the inner piece 12 and the actuating mechanism 8, a rotation of the grip 10 leads to a movement of the inner piece 12 in the guide 7. Here, the actuating mechanism 8 is supported on the guide 7. The guide 7 preferably has a front wall 17 on which the actuating mechanism 8 is supported.

FIG. 3 shows the inner piece 12 in an open position. In this position, the holding bar 5 is movable in the guide. That is to say, the openings 13 and 14 are oriented such that they allow the holding bar 5 enough play in order to be moved. The cross section of the opening 14 of the inner piece 12 is preferably larger than the cross section of the openings 13 of the guide.

Figure 4:
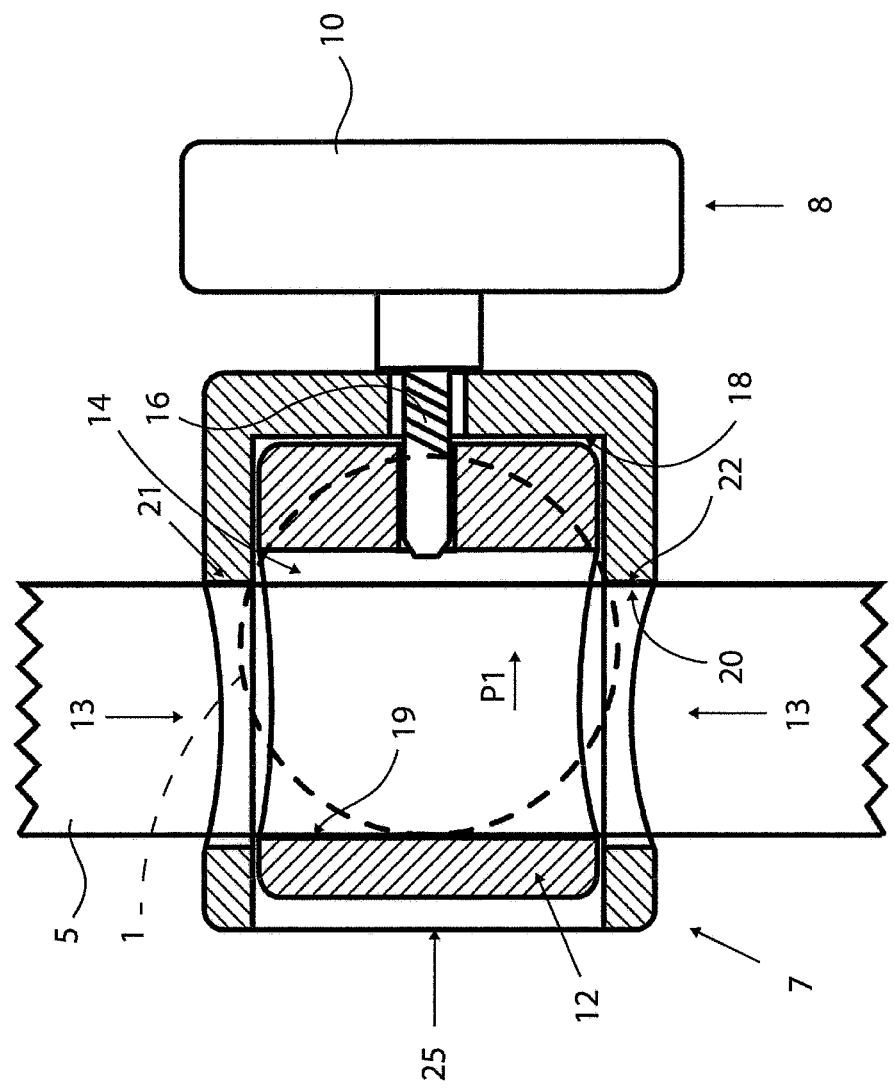
FIG. 4 shows the schematic sectional view according to FIG. 3, with the holding bar fixed in the guide.

FIG. 4 shows the holding bar 5 in a fixed state. The holding bar 5 is clamped by means of the grip 10 of the actuating mechanism 8 being rotated such that the thread 16 pulls the inner piece 12 in the direction of the grip 10, as is indicated by the arrow P1. It will be noted that the structure can in principle also be configured such that, by actuation of the actuating mechanism 8, the inner piece 12 is moved in the other direction, i.e. counter to the arrow P1, and the holding bar 5 is thus fixed. The actuating mechanism 8 then has to bear on the inner side 18 of the guide in order to apply the force to the inner piece 12. For this purpose, for example, a blocking ring can be provided.

During the movement of the inner piece 12 in the direction of the arrow P1, the opening 14 likewise migrates in the direction of the arrow P1 until the inner side 19 of the inner piece 12 comes to bear on the holding bar 5. The holding bar 5 is pressed against the inner side 20 of the opening 13 of the guide 7 and thereby fixed. An advantage of this illustrative embodiment is considered to be that the holding bar 5 is clamped by a large holding surface, which is made available by the inner side 19. This creates a stable and durable fixation of the holding bar in the guide 7.

It is also considered to be an advantage that the guide provides two bearing surfaces 21, 22. One bearing surface 21 is preferably arranged at the top and one bearing surface 22 at the bottom. In particular, one bearing surface 21 can be arranged above the frame and the other bearing surface 22 below the frame. Such an embodiment of the invention provides an advantageous orientation of the holding bar 5 with respect to the frame 1.

Figure 5:
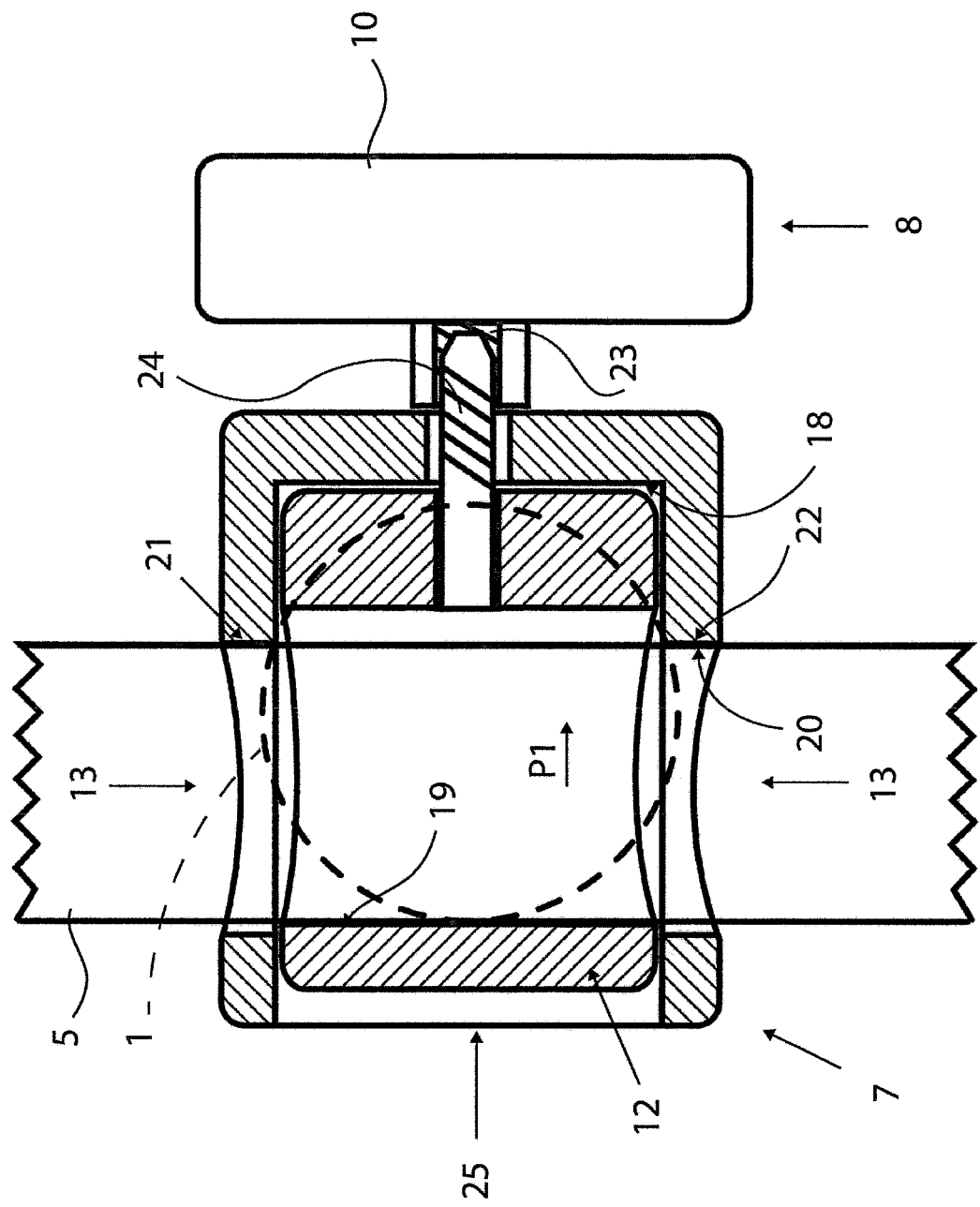
FIG. 5 shows a schematic view of an alternative illustrative embodiment to FIGS. 3 and 4.

FIG. 5 shows an alternative illustrative embodiment to FIGS. 3 and 4. For reasons of clarity, the same or similar component parts are identified by the same reference numbers, even if they are intended to differ slightly from each other in design. The illustrative embodiment according to FIG. 5 shows the holding bar in a fixed state. The illustrative embodiment differs from FIGS. 3 and 4 in that the actuating mechanism 8 has no threaded pin but instead a nut 23. The inner piece 12 has a threaded pin 24. The inner piece 12 and the actuating mechanism 8 are in threaded engagement. As in the illustrative embodiment according to FIGS. 3 and 4, rotation of the grip causes the inner piece 12 to be pulled in the direction of the arrow P1.

Figure 6:
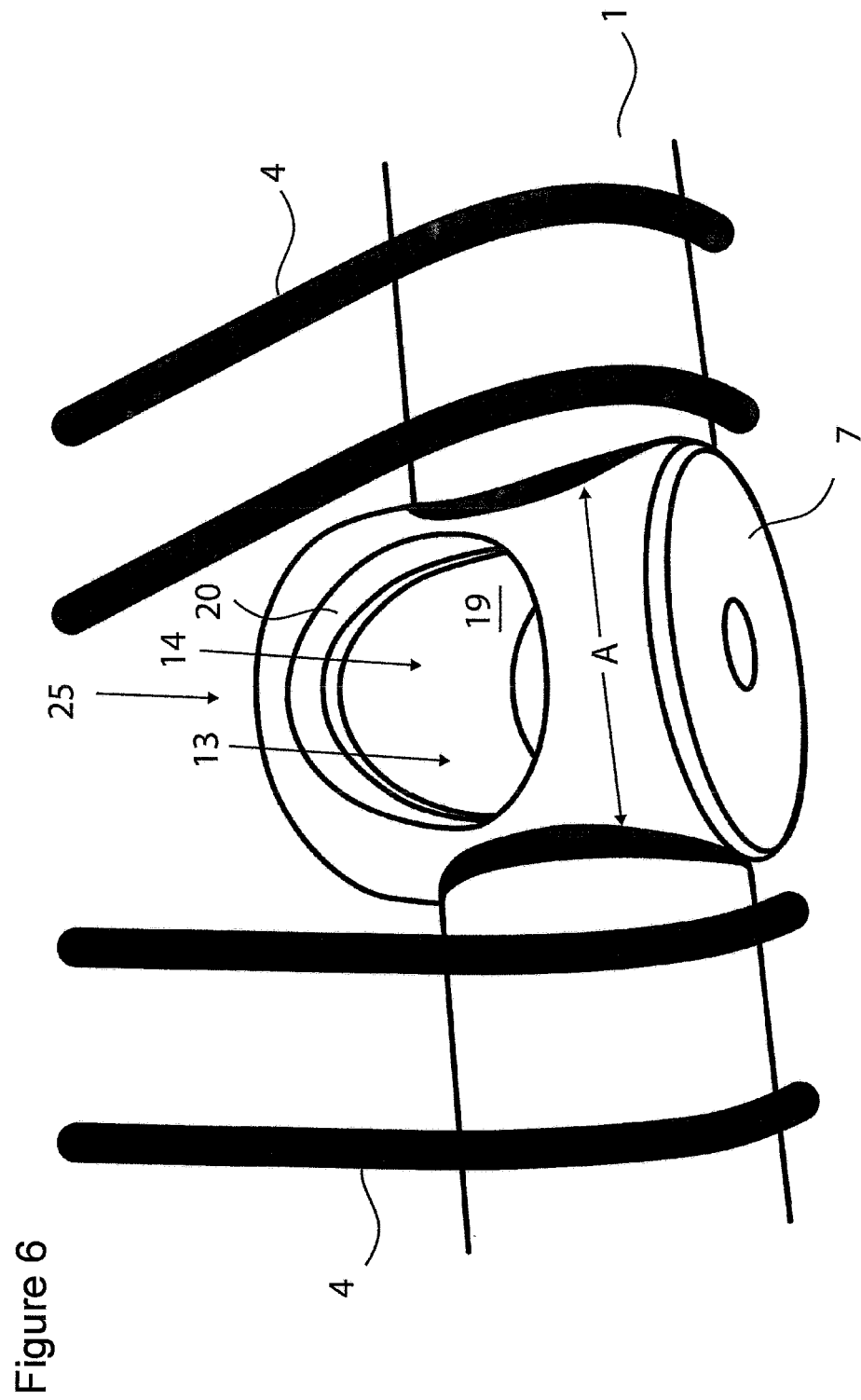
FIG. 6 shows a schematic view of the interaction between the inner piece and the guide, wherein the inner piece is received in the guide.
Figure 7:
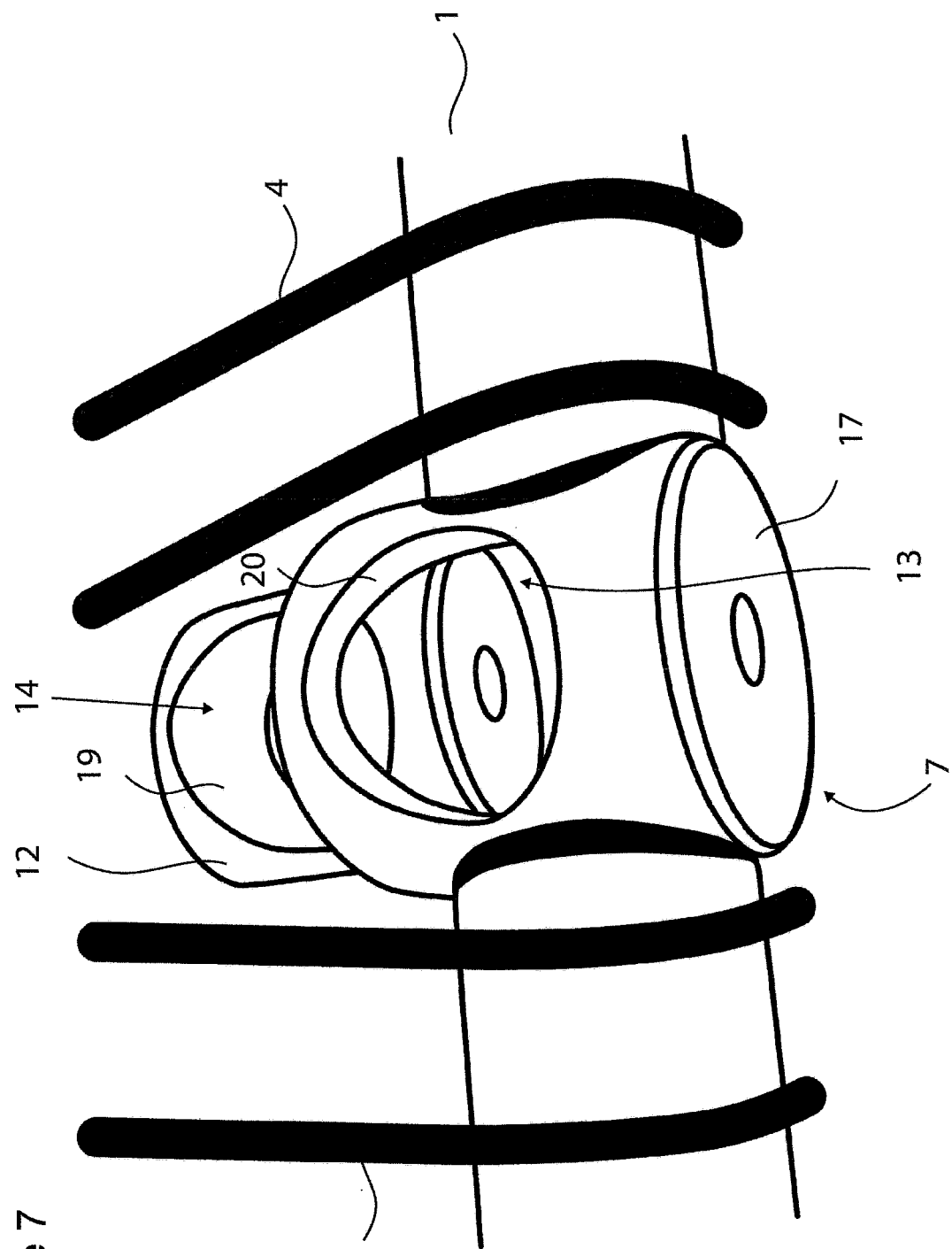
FIG. 7 shows a schematic view of the guide and the inner piece according to FIG. 7, wherein the inner piece is drawn slightly out of the guide.

FIGS. 6 and 7 show the interaction of the inner piece 12 and of the guide 7. For reasons of clarity, the actuating mechanism and the holding bar are omitted in the view. In FIG. 6, the inner piece 12 and the guide 7 are located in a position in which the openings 13 (of the guide) and 14 (of the inner piece) are flush. In this position, the holding bar can be inserted. The sectional opening resulting from the superpositioning of the openings 13, 14 must be at least as large as the cross section of the holding bar, so that the holding bar can be inserted through the guide 7 and the inner piece 12.

FIG. 7 shows a position of the inner piece 12 in a position in which it is drawn slightly out of the guide 7. Here, it is clearly advantageous if the guide has an opening 25 lying radially inward. The opening 25 preferably lies opposite the front wall 17. Through this opening 25, the inner piece 12 can be inserted into the guide 7 for assembling and pulled out for dismantling. Assembly is therefore very straightforward. At the same time, the combination of inner piece 12 and guide 7 creates stable clamping of the holding bar via the inner sides 19 and 20, as has been mentioned above.

The guide 7 is advantageously configured as a tube section. Such a tube section is easy to produce and is stable. In particular, the tube section can have a front wall 17 through which the actuating mechanism or a threaded pin protruding from the inner piece 12 extends (see FIG. 5).

Figure 8:
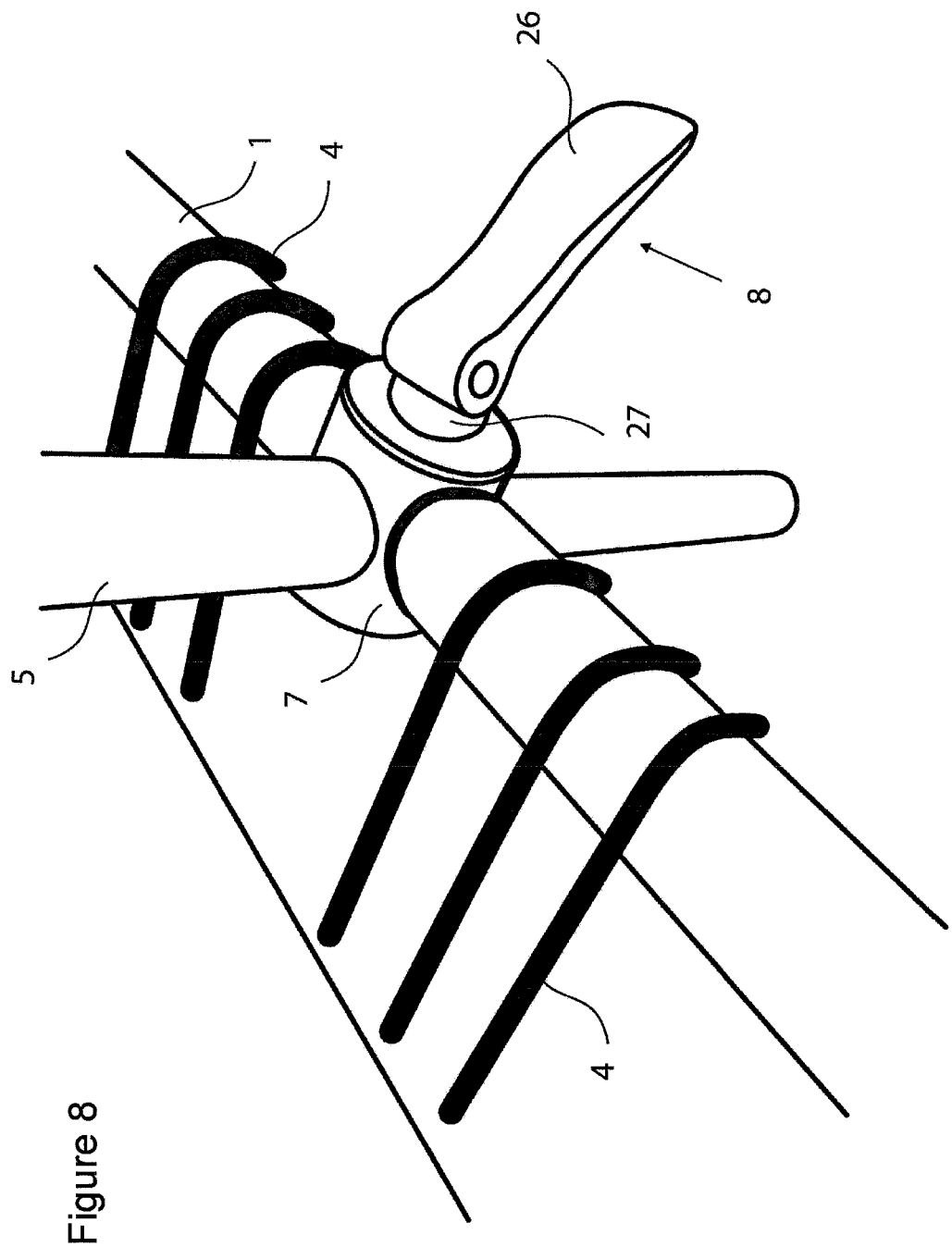
FIG. 8 shows a schematic view of an alternative embodiment of the actuating mechanism.

FIG. 8 shows an alternative embodiment of the actuating mechanism 8. The actuating mechanism has a tensioning lever 26. Here too, the tensioning lever and the inner piece are preferably in threaded engagement with each other (analogously to FIGS. 3 to 5). A rough adjustment is possible via the thread. The final clamping force is applied via the tensioning lever, which is advantageously supported on an intermediate piece 27 or directly on the guide 7. The intermediate piece 27 bears on the guide 7.

The frame shape is shown in the figures exclusively as being round. It can also be polygonal, in particular hexagonal or octagonal.

In the context of the description, all undefined terms of location such as "over", "under" or "laterally" are made with reference to a standing trampoline. Terms of location or terms of direction such as radially inward or radially outward are also used. These are given with reference to the frame, which can be either round (in its plan view) or polygonal. If it has a round shape, the round frame forms a center point of curvature. The statements made are with reference to this point. A guide, which extends radially, thus lies on a line which extends radially outward from the center point of curvature. In polygonal frame shapes, straight frame portions are regularly provided between the corners. The guide will then be arranged at the center of the frame portions. The perpendiculars extending from the center of each frame portion intersect at the center of the frame, such that a tube section extending radially with respect to the polygonal frame lies on a line running radially outward from the center. At the center of the frame portion, this line intersects the frame perpendicularly.

LIST OF REFERENCE SIGNS 1 frame
2 legs
3 bounce mat
4 spring elements
5 holding bar
6 handle
7 guide
8 actuating mechanism
9 weld seam
10 grip
11 rotation axle 12 inner piece
13 opening (of the guide)
14 opening (of the inner piece)
15 thread
16 threaded pin
17 front face
18 inner side
19 inner side
20 inner side (of the opening)
21 bearing surface
22 bearing surface
23 nut
24 threaded pin
25 opening
26 tensioning lever
27 intermediate ring
P1 arrow
A recess

The invention claimed is:

1. A trampoline comprising:
a stand which has a peripheral frame and a plurality of legs,
a bounce mat which is suspended elastically on the peripheral frame,
a guide which is secured to the stand,
a bar which is received in a height-adjustable manner in the guide, and
an inner piece which is slidably received in the guide,
wherein the bar is fixed by a relative movement between the inner piece and the guide,
wherein the guide is designed as a tube section including a peripheral circumferential wall, and
wherein the tube section is arranged perpendicularly with respect to an axial direction of the plurality of legs and includes first and second transverse openings in the peripheral circumferential wall through which the bar extends.

2. The trampoline as claimed in claim 1, wherein the inner piece is coupled to an actuating mechanism which is supported on the peripheral frame or on the guide or on an intermediate piece bearing on the guide.

3. The trampoline as claimed in claim 2, wherein the actuating mechanism and the inner piece are in threaded engagement.

4. The trampoline as claimed in claim 2, wherein the actuating mechanism has a threaded pin which engages with an inner thread of the inner piece.

5. The trampoline as claimed in claim 2, wherein the inner piece has a threaded pin which engages with an inner thread of the actuating mechanism.

6. The trampoline as claimed in claim 2, wherein the actuating mechanism is designed as a tensioning lever whose pivoting causes a movement of the inner piece in a direction of the tensioning lever.

7. The trampoline as claimed in claim 1, wherein the guide has an opening through which the inner piece is configured to be inserted into the guide.

8. The trampoline as claimed in claim 7, wherein the opening is directed radially inward.

9. The trampoline as claimed in claim 1, wherein the inner piece has an opening through which the bar extends.

10. The trampoline as claimed in claim 1, wherein the tube section opens radially inward and includes a generally closed outer end front wall that supports an actuating mechanism for the inner piece.

11. A trampoline comprising:
a stand which includes a peripheral frame and a plurality of legs,
a bounce mat which is suspended elastically on the peripheral frame,
a guide which is secured to the stand,
a bar which is received in a height-adjustable manner in the guide, and
an inner piece which is received in a radially movable manner in the guide,
wherein the bar is fixed by a relative movement between the inner piece and the guide,
wherein the inner piece includes an opening through which the bar extends,
wherein the guide has a longitudinal axis which is oriented radially in relation to a perpendicular axis extending through a plane of the peripheral frame.

12. The trampoline as claimed in claim 11, wherein the guide is welded to the peripheral frame.

13. The trampoline as claimed in claim 11, wherein the inner piece is coupled to an actuating mechanism which is supported on the peripheral frame or on the guide or on an intermediate piece bearing on the guide.

14. The trampoline as claimed in claim 11 wherein the guide is designed as a tube section.

15. The trampoline as claimed in claim 11, wherein the inner piece includes at least one of a thread and a threaded pin.

16. The trampoline as claimed in claim 11, wherein the guide includes first and second openings and wherein the openings in the guide and the opening in the inner piece are at least partly aligned in order to allow the bar to extend through the respective openings in the guide and the inner piece.

* * * * *